(12) United States Patent
Rahman et al.

(10) Patent No.: US 12,088,631 B2
(45) Date of Patent: *Sep. 10, 2024

(54) EVENT DETECTION AND MANAGEMENT FOR QUANTUM COMMUNICATIONS

(71) Applicant: AT&T Intellectual Property I, L.P., Atlanta, GA (US)

(72) Inventors: Moshiur Rahman, Marlboro, NJ (US); William R. Trost, Mequon, WI (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/931,521

(22) Filed: Sep. 12, 2022

(65) Prior Publication Data
US 2023/0007049 A1 Jan. 5, 2023

Related U.S. Application Data

(63) Continuation of application No. 16/704,034, filed on Dec. 5, 2019, now Pat. No. 11,444,979.

(51) Int. Cl.
*H04L 29/06* (2006.01)
*G06N 10/00* (2022.01)
(Continued)

(52) U.S. Cl.
CPC ............. *H04L 63/20* (2013.01); *G06N 10/00* (2019.01); *H04L 9/0852* (2013.01); *H04L 63/1416* (2013.01)

(58) Field of Classification Search
CPC ... H04L 63/20; H04L 9/0852; H04L 63/1416; H04L 63/062; G06N 10/00; H04W 12/043; H04W 12/121; H04W 12/61
See application file for complete search history.

(56) References Cited

U.S. PATENT DOCUMENTS 9,264,225 B1 * 2/2016 Hunt ................. H04L 9/0852
9,374,376 B2 * 6/2016 Hunt ................. H04L 9/0852
(Continued)

OTHER PUBLICATIONS

Hugues-Salas et al. "Experimental Demonstration of DDOS Mitigation over a Quantum Key Distribution (QKD) Network Using Software Defined Networking (SDN)" published in IEEE on Jun. 14, 2018, pp. 1-3. (Year: 2018).*

*Primary Examiner* — Baotran N To (57) ABSTRACT

The present disclosure describes event detection and management for quantum communications in a communication network. The event detection and management for quantum communications in a communication network may be provided based on event-based interaction between quantum nodes of the communication network and a network controller of the communication network, such as where the quantum nodes detect events associated with quantum communications and report the events associated with quantum communications to the network controller and where the network controller receives the events associated with quantum communications from the quantum nodes and initiates event management operations based on the events associated with quantum communications. The event detection and management for quantum communications in a communication network may be provided for various aspects of quantum communications, such as for quantum channels configured to support quantum information transfers, quantum information transfers via quantum channels, quantum applications, and so forth.

20 Claims, 5 Drawing Sheets

(51) Int. Cl.
*H04L 9/08* (2006.01)
*H04L 9/40* (2022.01)

(56) References Cited

U.S. PATENT DOCUMENTS

| | | | |
|---|---|---|---|
| 11,444,979 B2 * | 9/2022 | Rahman | H04W 12/61 |
| 2010/0265077 A1 | 10/2010 | Humble et al. | |
| 2016/0105439 A1 * | 4/2016 | Hunt | H04B 10/70 |
| | | | 726/4 |
| 2019/0149327 A1 | 5/2019 | Yuan et al. | |
| 2019/0379463 A1 | 12/2019 | Shields et al. | |
| 2021/0176278 A1 * | 6/2021 | Rahman | H04L 63/062 |
| 2023/0007049 A1 * | 1/2023 | Rahman | H04L 63/1416 |
| 2023/0155822 A1 * | 5/2023 | Chen | H04B 10/70 |
| | | | 257/14 |

\* cited by examiner

EVENT DETECTION AND MANAGEMENT FOR QUANTUM COMMUNICATIONS

TECHNICAL FIELD

This application is a continuation of U.S. patent application Ser. No. 16/704,034, filed Dec. 5, 2019, now U.S. Pat. No. 11,444,979, which is herein incorporated by reference in its entirety.

The present disclosure relates generally to communication systems and, more particularly, to various methods, computer-readable media, and apparatuses for supporting event detection and management for quantum communications in communication networks.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure describes event detection and management for quantum communications in a communication network. The event detection and management for quantum communications in a communication network may be provided based on event-based interaction between quantum nodes of the communication network and a network controller of the communication network, such as where the quantum nodes detect events associated with quantum communications and report the events associated with quantum communications to the network controller and where the network controller receives the events associated with quantum communications from the quantum nodes and initiates event management operations based on the events associated with quantum communications. The event detection and management for quantum communications in a communication network may be provided for various aspects of quantum communications which may be supported by quantum nodes of the communication network, such as for quantum channels configured to support quantum information transfers (e.g., events related to degradation of the quantum channels, events related to loss of the quantum channels, and the like), quantum information transfers via quantum channels (e.g., events related to corruption of quantum bits (qubits), events related to loss of qubits, and the like), quantum applications supporting quantum channels or quantum information transfers via quantum channels (e.g., events related to quantum channel establishment applications, events related to quantum information transfer applications, events related to quantum security applications, and the like, such as events related to one or more of quantum key distribution (QKD) applications, quantum teleportation applications, quantum failure detection applications, and the like), and so forth.

In one example, the present disclosure describes a method, a computer-readable medium, and an apparatus for providing event detection and management for quantum communications in a communication network. In one example, a method includes detecting, by a processing system of a quantum node in a communication network, an event associated with quantum communications by the quantum node and sending, by the processing system for delivery to a network controller of the communication network, an indication of the event associated with quantum communications by the quantum node. In one example, an apparatus includes a processing system including at least one processor and a computer-readable medium storing instructions which, when executed by the processing system, cause the processing system to perform operations, where the operations include detecting, by a quantum node in a communication network, an event associated with quantum communications by the quantum node and sending, by the quantum node for delivery to a network controller of the communication network, an indication of the event associated with quantum communications by the quantum node.

In one example, the present disclosure describes a method, a computer-readable medium, and an apparatus for providing event detection and management for quantum communications in a communication network. In one example, a method includes receiving, by a processing system of a network controller from a quantum node, an indication of an event associated with quantum communications by the quantum node and initiating, by the processing system of the network controller based on the indication of the event associated with quantum communications by the quantum node, an event management operation for the quantum communications by the quantum node. In one example, an apparatus includes a processing system including at least one processor and a computer-readable medium storing instructions which, when executed by the processing system, cause the processing system to perform operations, where the operations include receiving, by a processing system of a network controller from a quantum node, an indication of an event associated with quantum communications by the quantum node and initiating, by the processing system of the network controller based on the indication of the event associated with quantum communications by the quantum node, an event management operation for the quantum communications by the quantum node.

In one example, the present disclosure describes a method, a computer-readable medium, and an apparatus for providing event detection and management for quantum communications in a communication network. In one example, a method includes detecting, by a processing system of a quantum node in a communication network, an event associated with a quantum security application configured to provide security for at least one of a quantum channel supported by the quantum node and an information transfer via the quantum channel supported by the quantum node and sending, by the processing system for delivery to a network controller of the communication network, an indication of the event associated with the quantum security application. In one example, an apparatus includes a processing system including at least one processor and a computer-readable medium storing instructions which, when executed by the processing system, cause the processing system to perform operations, where the operations include detecting, by a quantum node in a communication network, an event associated with a quantum security application configured to provide security for at least one of a quantum channel supported by the quantum node and an information transfer via the quantum channel supported by the quantum node and sending, by the quantum node for delivery to a network controller of the communication network, an indication of the event associated with the quantum security application.

In one example, the present disclosure describes a method, a computer-readable medium, and an apparatus for providing event detection and management for quantum communications in a communication network. In one example, a method includes receiving, by a processing system of a network controller from a quantum node, an indication of an event associated with a quantum security application configured to provide security for at least one of a quantum channel supported by the quantum node and an information transfer via the quantum channel supported by the quantum node and initiating, by the processing system of the network controller based on the indication of the event associated with the quantum security application, an event management operation for the quantum security application. In one example, an apparatus includes a processing system including at least one processor and a computer-readable medium storing instructions which, when executed by the processing system, cause the processing system to perform operations, where the operations include receiving, by a processing system of a network controller from a quantum node, an indication of an event associated with a quantum security application configured to provide security for at least one of a quantum channel supported by the quantum node and an information transfer via the quantum channel supported by the quantum node and initiating, by the processing system of the network controller based on the indication of the event associated with the quantum security application, an event management operation for the quantum security application.

It will be appreciated that, although primarily presented herein with respect to providing event detection and management for quantum communications in a particular type of communication network (namely, a Fifth Generation (5G) cellular network) based on a particular communication network architecture (namely, based on use of Mobile Edge Computing (MEC), network slicing based on virtualization technologies, and network control that is based on Software Defined Networking (SDN)), various examples presented herein may be used for providing event detection and management for quantum communications in various other types of communication networks (e.g., other cellular networks (e.g., Long Term Evolution (LTE), 3G, and the like), other types of wireless networks (e.g., satellite networks, WiFi networks, and the like), wireline networks (e.g., optical networks, cable networks, and the like), and so forth), various examples presented herein may be used for providing event detection and management for quantum communications in communication networks based on various other communication network architectures (e.g., with or without use of edge computing, with or without use of network slicing, using various other types of virtualization technologies, using various other types of network control technologies, and the like), and so forth.

These and other aspects of the present disclosure are described in greater detail below in connection with the examples of FIGS. 1-5.

Figure 1:
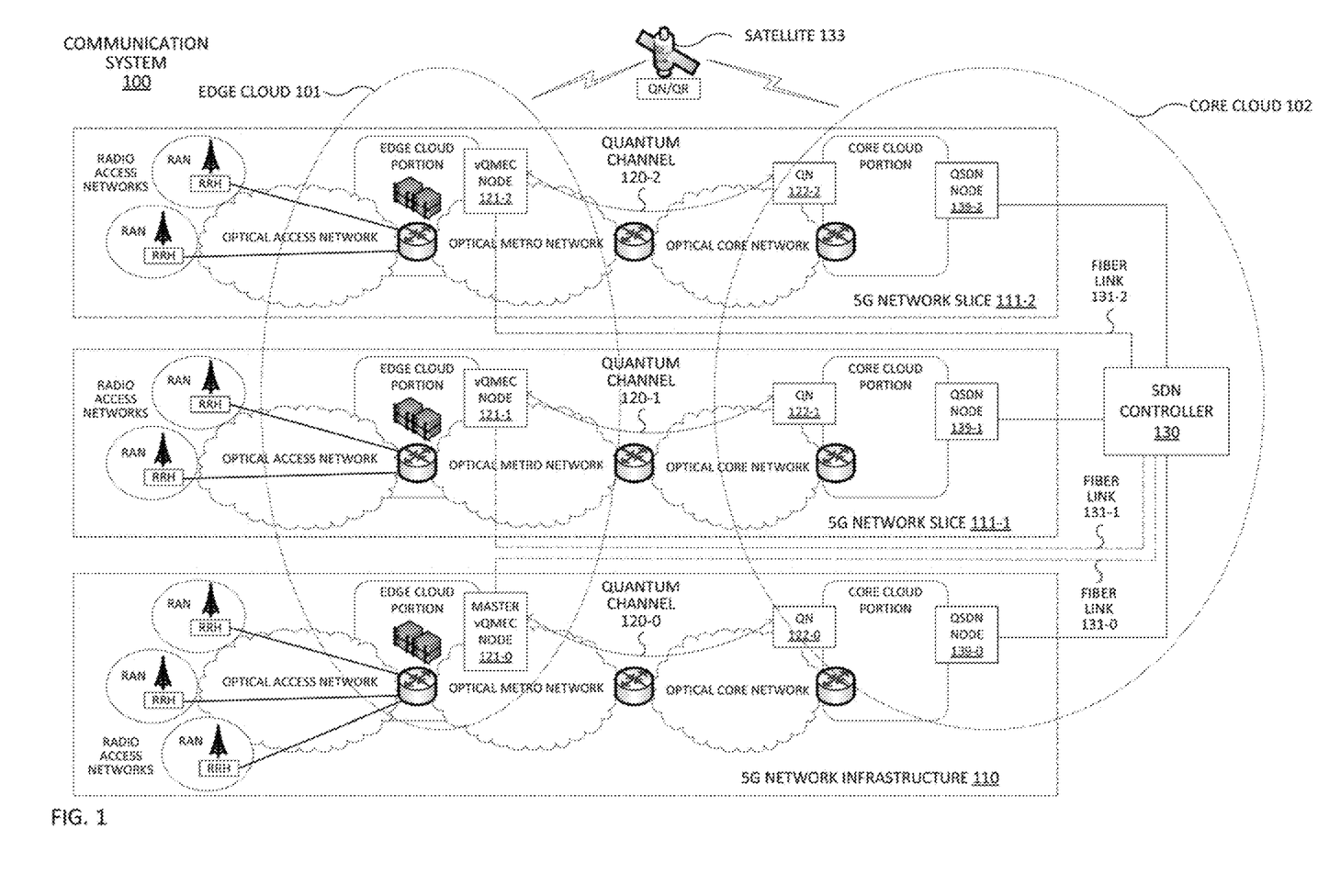
FIG. 1 illustrates an example communication system for providing event detection and management for quantum communications in a communication network.

FIG. 1 illustrates an example communication system for providing event detection and management for quantum communications in a communication network.

The communication system 100 of FIG. 1 is configured to support quantum communications. The communication system 100 of FIG. 1 is configured to support quantum communications based on quantum computing techniques. In the example of FIG. 1, the communication system 100 is a 5G communication system; however, it will be appreciated that the communication system 100 may be any other type of communication system in which quantum communications may be used (e.g., other types of wireless communication systems (e.g., a 4G cellular communication system, a 3G cellular communication system, and the like), a wireline communication system (e.g., an optical communication system, a hybrid fiber coaxial (HFC) communication system, and the like), and so forth).

The communication system 100 includes an access network portion implemented as an edge cloud 101 and a core network portion implemented as a core cloud 102. The edge cloud 101 and the core cloud 102 may be supported using various types of physical and virtual resources, various types of virtualization technologies and techniques, and so forth.

The communication system 100 includes a 5G network infrastructure 110. It will be appreciated that the 5G network infrastructure 110 may include physical resources and infrastructure, virtual resources and infrastructure, or a combination thereof. For example, the 5G network infrastructure 110 may include various types of physical resources (e.g., physical computing resources, physical memory resources, physical storage resources, physical input-output resources, hosts, and the like) configured to support various types of virtualized resources (e.g., virtualized processing resources, virtualized memory resources, visualized storage resources, virtualized input-output resources, virtual machines (VMs), virtual containers (VCs), and the like). For example, the 5G network infrastructure 110 may include various types of physical infrastructure (e.g., physical network elements (e.g., 5G remote radio heads (RRHs), switches, routers, servers, storage devices, and so forth), physical links, and the like), various types of virtual infrastructure (e.g., virtualized network functions (VNFs), based on network function virtualization (NFV), which may be provided based on various types of virtualized resources (e.g., virtualized processing resources, virtualized memory resources, visualized storage resources, virtualized input-output resources, VMs, VCs, and the like)), and so forth.

The 5G network infrastructure 110 includes infrastructure that is part of the edge cloud 101 and infrastructure that is part of the core cloud 102. The 5G network infrastructure 110 includes radio access networks (e.g., including remote radio units (RRUs)) which may support communications with end devices (e.g., smartphones, tablet computers, laptop computers, Internet-of-Things (IoT) devices, and so forth, which have been omitted from FIG. 1 for purposes of clarity), an optical access network supporting communications with the radio access networks, an edge cloud portion supporting communications with the optical access network, an optical metro network supporting communications with the edge cloud portion, an optical core network supporting communications with the optical metro network, and a core cloud portion supporting communications with the optical metro network. As illustrated in FIG. 1, the edge cloud portion and at least part of the optical metro network are considered to be part of the edge cloud 101 and the core cloud portion is considered to be part of the core cloud 102. It will be appreciated that other groupings or arrangements of the various elements may be supported.

It will be appreciated that the 5G network infrastructure 110 may be configured in various other ways (e.g., including different numbers of elements, different types of elements, different arrangements of elements, different types of resources, different arrangements of resources, and so forth).

The communication system 100 is configured to support a set of 5G network slices 111 (illustratively, two 5G network slices 111 including a first 5G network slice 111-1 and a second 5G network slice 111-2, although it will be appreciated that fewer or more 5G network slices 111 may be supported). In general, network slicing can be used by a single network operator for operational purposes, such as to differentiate characteristics and resources for different broad classes of services, such as communication services, support services, security services, and so forth. In general, a network slice is a logical (e.g., virtual) network customized to serve a defined business purpose or customer, and includes the end-to-end composition of the varied network resources required to satisfy the specific performance and economic needs of that particular business purpose (e.g., service class) or customer (e.g., customer application). It will be appreciated that network slicing offers a conceptual way of viewing and realizing service provider networks by building logical networks on top of a common and shared infrastructure layer (e.g., 5G network infrastructure 110). The 5G network slices 111 may be provided based on NFV using various VNFs, which may be supported by the common and shared infrastructure layer (e.g., 5G network infrastructure 110). Accordingly, it will be appreciated that the 5G network slices 111 may be virtualized network slices supported using the 5G network infrastructure 110 and, thus, that the various elements of the 5G network slices 111 may be portions of, and provided by, corresponding elements of the 5G network infrastructure 110, respectively.

The communication system 100, as indicated above, is configured to support a set of 5G network slices 111. As illustrated in FIG. 1, each 5G network slice 111 includes radio access networks (e.g., including RRUs) which may support communications with end devices (e.g., smartphones, tablet computers, laptop computers, IoT devices, and so forth, which have been omitted from FIG. 1 for purposes of clarity), an optical access network supporting communications with the radio access networks, an edge cloud portion supporting communications with the optical access network, an optical metro network supporting communications with the edge cloud portion, an optical core network supporting communications with the optical metro network, and a core cloud portion supporting communications with the optical metro network. Similarly, as illustrated in FIG. 1, the edge cloud portion and at least part of the optical metro network are considered to be part of the edge cloud 101 and the core cloud portion is considered to be part of the core cloud 102, although it will be appreciated that other groupings or arrangements of the various elements may be supported. It will be appreciated that the various elements of each 5G network slice 111 may be considered to be slices, or portions, of the corresponding elements of the 5G network infrastructure 110 underlying the 5G network slices 111 and upon which the 5G network slices 111 are based, respectively. It will be appreciated that the 5G network slices 111 may be configured in various other ways (e.g., including different numbers of elements, different types of elements, different arrangements of elements, different types of resources, different arrangements of resources, and so forth).

The communication system 100, as indicated above, is configured to support quantum communications. In general, quantum communications utilizes laws of quantum physics for transfers of data in a manner that is particularly well-suited to protect the data. The laws of quantum physics that are used allow particles (typically photons of light for transferring data across optical cables, although it will be appreciated that other types of particles may be used) to be used as quantum bits (qubits). The qubits may assume states of superposition, which means that the qubits can represent multiple combinations of "0" and "1" at the same time. The data transferred based on quantum communications is secure due to the fact that an entity attempting to observe the data is unable to observe the data without leaving an indication that the data has been observed (e.g., since the quantum state of a qubit that is observed will collapse to either a "0" or a "1" as a result of the tampering by the entity). These laws of quantum physics may be utilized to create various applications which may support various aspects of quantum communications, including quantum security applications for securing transfers of data based on quantum communications (e.g., applications such as QKD quantum teleportation applications, and so forth).

The communication system 100, as indicated above, may be configured to support quantum communications based on support for various aspects of quantum communications. The communication system 100 may be configured to support quantum communications by supporting quantum channels configured to support quantum information transfers, supporting quantum information transfers via quantum channels, supporting quantum applications configured to support quantum channels and quantum information transfers via quantum channels, and so forth. It will be appreciated that the communication system 100 may be configured to support various other aspects of quantum communications and, therefore, also may be configured to support event detection and management for various other aspects of quantum communications. The communication system 100 may be configured to support quantum communications based on various quantum computing technologies, techniques, capabilities, and so forth.

The communication system 100, as indicated above, is configured to support quantum channels. The quantum channels are configured to support information transfers, which may include quantum information transfers (as primarily discussed herein) and which also may include classical information transfers. The quantum channels supported by communication system 100 are established between quantum-enabled nodes of the communication system 100. As illustrated in FIG. 1, a set of quantum channels 120 is established within the communication system 100 for supporting quantum information transfers within the communication system 100. The quantum channels 120 are established between virtual quantum Mobile Edge Computing (vQMEC) nodes 121 located within the edge cloud 101 and quantum nodes (QNs) 122 located within the core cloud 102. As further illustrated in FIG. 1, a quantum channel 120-0 is established between a master vQMEC node 121-0 of the 5G network infrastructure 110 in the edge cloud 101 and a QN 122-0 of the 5G network infrastructure 110 in the core cloud 102, a quantum channel 120-1 is established between a vQMEC node 121-1 of the first 5G network slice 111-1 in the edge cloud 101 and a QN 122-1 of the first 5G network slice 111-1 in the core cloud 102, and a quantum channel 120-2 is established between a vQMEC node 121-2 of the second 5G network slice 111-2 in the edge cloud 101 and a QN 122-2 of the second 5G network slice 111-2 in the core cloud 102. It will be appreciated that, although presented with respect to an example in which a particular vQMEC node 121 has been elected as a master (namely, the vQMEC node 121-0 that is associated with the 5G network infrastructure 110) and, thus, in which the other vQMEC nodes 121 operate as hubs, any other vQMEC node 121 (e.g., even one associated with a 5G network slice 111 rather than the 5G network infrastructure 110) may be elected to operate as the master for the vQMEC nodes 121 or the vQMEC nodes 121 may operate without using a master. It will be appreciated that, here, given use of the quantum channel 120-1 and the quantum channel 120-2 within the first 5G network slice 111-1 and the second 5G network slice 111-2, respectively, the 5G network slices 111 may be considered to be quantum enabled slices. It will be appreciated that fewer or more quantum channels 120 may be established, quantum channels 120 may be established between various other types of quantum enabled devices, and so forth.

The quantum information transfers supported by the communication system 100 may include various types of quantum information transfers which may be supported based on support for quantum communications by communication system 100. The quantum information transfers supported by the communication system 100 may include various types of quantum information transfers which may be supported over the quantum channels 120. The quantum information transfers supported by the communication system 100 may include various types of quantum information transfers which may be provided based on various quantum computing technologies, techniques, and so forth. The quantum information transfers may be based on use of quantum bits (qubits). The quantum information transfers may be used to support transfers of various types of digital data which may be transferred across communication networks. For example, the quantum information transfers may be used to support transfers of digital data such as text, audio, video, multimedia, and the like. It will be appreciated that various other information transfers via the quantum channels 120 may be supported by the communication system 100 based on support for quantum communications by the communication system 100.

The quantum applications supported by the communication system 100 may include various types of quantum applications which may be supported based on support for quantum communications by the communication system 100. The quantum applications supported by the communication system 100 may include quantum applications configured to support the quantum channels 120, quantum applications configured to support information transfers via the quantum channels 120, and so forth. The quantum applications which may support the quantum channels 120 and the quantum information transfers via the quantum channels 120 may include quantum channel establishment applications, quantum channel monitoring applications, quantum information transfer applications, quantum information transfer monitoring applications, quantum failure detection applications, quantum security applications (e.g., quantum channel security applications, quantum information transfer security applications, and the like, such as QKD applications, quantum teleportation applications, and the like), and so forth. It will be appreciated that various other types of quantum applications may be used to support the quantum channels 120 and the quantum information transfers via the quantum channels 120. It will be appreciated that various other quantum applications may be supported by the communication system 100 based on support for quantum communications by the communication system 100.

The vQMEC nodes 121 are quantum-enabled nodes configured to support various aspects of quantum communications as discussed above, such as support for quantum channels 120 (e.g., establishment of the quantum channels 120, monitoring of the quantum channels 120, and the like), support for transfer of information (e.g., quantum information, classical information, and so forth) over the quantum channels 120, support for use of various quantum applications (e.g., to support the quantum channels 120, to support transfer of information over the quantum channels 120, and the like), and so forth. The vQMEC nodes 121 may be configured to support various functions for supporting various aspects of quantum communications within the communication system 100, including functions for supporting event detection and management for quantum communications in the communication system 100 (e.g., detecting and reporting events, receiving and processing configuration instructions provided based on event management operations initiated in response to reported events, and so forth, as discussed further herein). In one example, a vQMEC node 121 includes a computing device or processing system, such as computing system 500 depicted in FIG. 5, and, thus, may be configured to provide one or more operations or functions for supporting quantum event detection and management for quantum communications in accordance with the present disclosure.

The QNs 122 are quantum-enabled nodes configured to support various aspects of quantum communications as discussed above, such as support for quantum channels 120 (e.g., establishment of the quantum channels 120, monitoring of the quantum channels 120, and the like), support for transfer of information over the quantum channels 120, support for use of various quantum applications (e.g., to support the quantum channels 120, to support transfer of information over the quantum channels 120, and the like), and so forth. The QNs 122 may be configured to support various functions for supporting various aspects of quantum communications within the communication system 100, including functions for supporting event detection and management for quantum communications in the communication system 100 (e.g., detecting and reporting events, receiving and processing configuration instructions provided based on event management operations initiated in response to reported events, and so forth). In one example, a QN 122 includes a computing device or processing system, such as computing system 500 depicted in FIG. 5, and, thus, may be configured to provide one or more operations or functions for supporting event detection and management for quantum communications as discussed herein.

The communication system 100 is configured to support software defined networking (SDN) functions which may be used to support management of the communication system 100.

The communication system 100 includes an SDN controller 130 configured to support management of the communication system 100 based on SDN. As illustrated in FIG. 1, the SDN controller 130 is deployed within the core cloud 102. The SDN controller 130 may be configured to provide various control functions for supporting control over various aspects of communication system 100. For example, the SDN controller 130 may be configured to support various control functions (e.g., provisioning functions, monitoring functions, management functions, programming functions, and so forth) which may support efficient automation of control over various aspects of various elements within the edge cloud 101 and across the various network slices 111 of the communication system 100. The SDN controller 130 also may be configured to support various control functions for controlling various aspects of quantum communications within the communication system 100, including control functions for supporting event detection and management for quantum communications in the communication system 100. It will be appreciated that the SDN controller 130 may be configured to support various other control functions for controlling various aspects of communication system 100. In one example, the SDN controller 130 includes a computing device or processing system, such as computing system 500 depicted in FIG. 5, and, thus, may be configured to provide one or more operations or functions for supporting event detection and management for quantum communications as discussed herein.

The communication system 100 is configured to support communications between the SDN controller 130 and the vQMEC nodes 121 for purposes of supporting event detection and management for quantum communications in communication system 100. The communications between the SDN controller 130 and the vQMEC nodes 121 may include communications of the vQMEC nodes 121 to the SDN controller 130 (directly from the vQMEC nodes 121 to the SDN controller 130 or indirectly from the vQMEC nodes 121 to the SDN controller 130 via the master vQMEC node 121-0), which may include communications related to reporting of events detected by the vQMEC nodes 121, sending of other types of data collected by the vQMEC nodes 121 to the SDN controller 130, and so forth. The communications between the SDN controller 130 and the vQMEC nodes 121 may include communications of SDN controller 130 to the vQMEC nodes 121 (directly to the vQMEC nodes 121 from the SDN controller 130 or indirectly to the vQMEC nodes 121 from the SDN controller 130 via the master vQMEC node 121-0), which may include communications related to performing event management operations based on events received from vQMEC nodes 121, sending rules for use by the vQMEC nodes 121 in performing event monitoring, detection, and reporting, and so forth. The communications between the SDN controller 130 and the vQMEC nodes 121 may be performed using a set of fiber links 131 (illustratively, a fiber link 131-0 between the SDN controller 130 and the master vQMEC node 121-0, a fiber link 131-1 between the SDN controller 130 and the vQMEC node 121-1, and a fiber link 131-2 between the SDN controller 130 and the vQMEC node 121-2). The communications between the SDN controller 130 and the vQMEC nodes 121 may be performed using satellite links via a satellite 133 (which may be used in addition to the fiber links 131, instead of the fiber links 131 (e.g., when a fiber link 131 fails), and so forth), where it will be appreciated that such communications are represented in FIG. 1 using a representation of connection of elements of the edge cloud 101 to elements of the core cloud 102 via the satellite 133. It will be appreciated that various other numbers and types of communication channels may be used to support communications between the SDN controller 130 and the vQMEC nodes 121 for purposes of supporting event detection and management for quantum communications in communication system 100.

The communication system 100 includes a set of quantum SDN (QSDN) nodes 139 configured to support communications of the SDN controller 130 in supporting management of the communication system 100 based on SDN. As illustrated in FIG. 1, the set of QSDN nodes 139 includes a QSDN node 139-0 deployed within the core cloud 102 and configured to support communications between SDN controller 130 and elements of the 5G network infrastructure 110 (e.g., QN 122-0 of core cloud 102, master vQMEC node 121-0 of edge cloud 101, and so forth), a QSDN node 139-1 deployed within the core cloud 102 and configured to support communications between SDN controller 130 and elements of the first 5G network slice 111-1 (e.g., QN 122-1 of core cloud 102, vQMEC node 121-1 of edge cloud 101, and so forth), and a QSDN node 139-2 deployed within the core cloud 102 and configured to support communications between SDN controller 130 and elements of the second 5G network slice 111-1 (e.g., QN 122-2 of core cloud 102, vQMEC node 121-2 of edge cloud 101, and so forth). It will be appreciated that the QSDN nodes 139 may be configured to support various other functions for supporting control of the communication system 100 by SDN controller 130. In one example, a QSDN node 139 includes a computing device or processing system, such as computing system 500 depicted in FIG. 5, and, thus, may be configured to provide one or more operations or functions for supporting event detection and management for quantum communications as discussed herein.

The communication system 100, as indicated above, may be configured to provide event detection and management for quantum communications within the communication system 100. The vQMEC nodes 121 may detect events associated with quantum communications and report the events associated with quantum communications to the SDN controller 130. The SDN controller 130 may receive events associated with quantum communications that are reported by the vQMEC nodes 121 and initiate event management operations based on the events associated with quantum communications that are reported by the vQMEC nodes 121. The operation of communication system 100, including the vQMEC nodes 121 and the SDN controller 130, in supporting event detection and management for quantum communications within the communication system 100 is discussed further below.

The vQMEC nodes 121, as indicated above, may detect events associated with quantum communications and report the events associated with quantum communications to the SDN controller 130. It will be appreciated that the vQMEC nodes 121 also may provide various other functions configured to support event detection and management for quantum communications within the communication system 100.

The vQMEC nodes 121, as indicated above, may detect events associated with quantum communications. The events associated with quantum communications may include various events associated with support of quantum communications by the vQMEC nodes 121 (e.g., various aspects of quantum communications, such as quantum channels 120, quantum information transfers via quantum channels 120, quantum applications (e.g., quantum applications configured to support quantum channels 120, quantum applications configured to support quantum information transfers via quantum channels 120, and the like), and so forth). The events associated with quantum communications may include events associated with the quantum channels 120 configured to support quantum information transfers (e.g., events related to degradation of the quantum channels 120, events related to loss of the quantum channels 120, and the like). The events associated with quantum communications may include events associated with quantum information transfers supported by the quantum channels 120 (e.g., events related to corruption of qubits, events related to loss of qubits, and the like). The events associated with quantum communications may include events associated with quantum applications supporting the quantum channels 120 and/or supporting quantum information transfers via the quantum channels 120 (e.g., an event associated with a quantum channel establishment application, an event associated with a quantum channel monitoring application, an event associated with a quantum information transfer application, an event associated with a quantum information transfer monitoring application, an event associated with a quantum failure detection application, an event associated with a quantum security application (e.g., a security event associated with a QKD application for symmetric key establishment, a security event associated with a teleportation application, and the like), and so forth). The events associated with quantum communications, since such events are detected by vQMEC nodes 121, also may be considered to be events associated with the vQMEC nodes 121 (i.e., events associated with quantum nodes or quantum-enabled nodes that are configured to support various aspects of quantum communications). It will be appreciated that the vQMEC nodes 121 may be configured to monitor for various other types of events which may occur within the context of various different aspects of quantum communications.

The vQMEC nodes 121, as indicated above, may detect events associated with quantum communications. The vQMEC nodes 121 may detect events associated with quantum communications by monitoring for events associated with quantum communications. The vQMEC nodes 121 may monitor for events associated with quantum communications based on collection of data, filtering of data, processing of data, and so forth, which may vary based on the type(s) of event(s) for which monitoring is being performed. The vQMEC nodes 121 may monitor for events associated with quantum communications based on various parameters, thresholds, and so forth, which may vary based on the type(s) of event(s) for which monitoring is being performed.

The vQMEC nodes 121, as indicated above, may report detected events associated with quantum communications to the SDN controller 130. The vQMEC nodes 121 may report detected events to the SDN controller 130 directly (e.g., using communication channels between the vQMEC nodes 121 and the SDN controller 130 that do not pass through the master vQMEC node 121-0). The vQMEC nodes 121 may report detected events to the SDN controller 130 indirectly (e.g., by reporting the detected events to the master vQMEC node 121-0 which may then report the detected events to the SDN controller 130). The vQMEC nodes 121 may report detected events to the SDN controller 130 using various protocols, notifications, messages, formats, and so forth, which may depend on the network type of the underlying communication network, the type of event being reported, and so forth.

The vQMEC nodes 121, in addition to detecting and reporting events associated with quantum communications to the SDN controller 130, also may report various types of data (e.g., raw data collected by the vQMEC nodes 121 independent of monitoring for events, raw data collected by the vQMEC nodes 121 in conjunction with monitoring for events, processed data produced by the vQMEC nodes 121 based on local processing of raw data collected by the vQMEC nodes 121, and the like) to the SDN controller 130 (e.g., directly without using the master vQMEC node 121-0, indirectly via the master vQMEC node 121-0, and so forth) for use by the SDN controller for various purposes (e.g., creation or modification of event detection and reporting rules for the vQMEC nodes 121, load balancing purposes, and so forth).

The vQMEC nodes 121 may detect and report events associated with quantum communications based on sets of event detection and reporting rules maintained by the vQMEC nodes 121 or otherwise available to the vQMEC nodes 121. The set of event detection and reporting rules for a vQMEC node 121 may specify the types of events for which the vQMEC nodes 121 are to perform monitoring (e.g., quality or security events associated with the quantum channels 120, quality or security events associated with quantum information transfers via the quantum channels 120, events associated with quantum applications supporting the quantum channels 120, events associated with quantum applications supporting quantum information transfers via the quantum channels 120, and so forth), specifics regarding the manner in which the vQMEC nodes 121 are to perform monitoring for the types of events for which the vQMEC nodes 121 are to perform monitoring (e.g., one or more parameters or thresholds to be used for monitoring for degradation of the quantum channel 120 supporting the quantum communication, one or more parameters or thresholds to be used for monitoring for loss of the quantum channel 120 supporting the quantum communication, an indication that timers are to be used for monitoring for a problem with the QKD application used for symmetric key establishment, and the like), the manner in which detected events are to be reported to the SDN controller 130 (e.g., directly or indirectly, types of notifications or messages to be used, types of formatting to be used, and the like), and so forth. The set of event detection and reporting rules for a vQMEC node 121 may be in the form of one or more policies. The sets of event detection and reporting rules for the vQMEC nodes 121 may be created by the SDN controller 130 (e.g., based on analysis of data received by the SDN controller 130 from the vQMEC nodes 121, such as based on data collected and reported by the vQMEC nodes 121 independent of monitoring for events, data collected and reported by the vQMEC nodes 121 in conjunction with monitoring for events, events reported by the vQMEC nodes 121, and the like) or other suitable sources. The sets of event detection and reporting rules for the vQMEC nodes 121 may be provided to the vQMEC nodes 121 by the SDN controller 130 (e.g., obtained by the SDN controller 130 from another entity and provided to the vQMEC nodes 121 directly or indirectly via the master vQMEC node 121-0, created by the SDN controller 130 and provided to the vQMEC nodes 121 directly or indirectly via the master vQMEC node 121-0, and the like) or other suitable sources.

It will be appreciated that the vQMEC nodes 121 also may provide various other functions configured to support event detection and management for quantum communications within the communication system 100, and that various functions performed by the vQMEC nodes 121 within the context of supporting event detection and management for quantum communications may be used for various other purposes.

The SDN controller 130 may receive events associated with quantum communications that are reported by the vQMEC nodes 121 and initiate event management operations based on the events associated with quantum communications that are reported by the vQMEC nodes 121. It will be appreciated that the SDN controller 130 also may provide various other functions configured to support event detection and management for quantum communications within the communication system 100.

The SDN controller 130, as indicated above, may receive events associated with quantum communications that are reported by the vQMEC nodes 121. The SDN controller 130 may receive events associated with quantum communications that are reported by the vQMEC nodes 121 directly (e.g., using communication channels between the vQMEC nodes 121 and the SDN controller 130 that do not pass through the master vQMEC node 121-0). The SDN controller 130 may receive events associated with quantum communications that are reported by the vQMEC nodes 121 indirectly (e.g., via the master vQMEC node 121-0). The SDN controller 130 may receive events associated with quantum communications that are reported by the vQMEC nodes 121 using various protocols, notifications, messages, formats, and so forth, which may depend on the network type of the underlying network, the type of event being reported, and so forth.

The SDN controller 130, as indicated above, may initiate event management operations based on the events associated with quantum communications that are reported by the vQMEC nodes 121. The event management operation that is initiated for an event associated with quantum communications may vary for different event types. The event management operation may include a recovery operation for recovering from the event (e.g., recovering from a quantum channel degradation, loss of qubits, a quantum security breach, and the like). The event management operation may include one or more of providing additional quantum computing resources (e.g., instantiation of additional virtual resources, such as VMs, VCs, and the like), provisioning or activating one or more protection channels or paths, and so forth. It will be appreciated that various other types of event management operations may be initiated for various types of events associated with quantum communications that are reported by the vQMEC nodes 121.

It will be appreciated that, although primarily presented with respect to initiating event management operations, the SDN controller 130 may initiate various other management actions based on events associated with quantum communications that are reported by the vQMEC nodes 121.

It will be appreciated that, although primarily presented with respect to examples in which event management operations are initiated by the SDN controller 130, various event management operations may be initiated by various other entities included within the communication system 100 or associated with the communication system 100.

It will be appreciated that the SDN controller 130 also may provide various other functions configured to support event detection and management for quantum communications within the communication system 100, and that various functions performed by the SDN controller 130 within the context of supporting event detection and management for quantum communications may be used for various other purposes.

It will be appreciated that various aspects of providing event detection and management for quantum communications may be further understood by considering application of event detection and management capabilities to a particular type of quantum application, such as the QKD application for secret key establishment for use in securing quantum information exchanges on a quantum channel. For example, QKD protocols may establish a symmetric key between two parties who are generally known in the cryptographic community as Alice and Bob. To begin the process of establishing a private key, Alice uses quantum or classical means to generate a random sequence of classical bit values (a random subset of which becomes the final private key). Here, Alice randomly encodes each bit of this sequence in the polarization state of a photon by randomly choosing, for each bit, one of the following two agreed-upon bases in which to encode the bit: the standard basis or the Hadamard basis. Alice then sends this sequence of photons to Bob through the quantum channel. Bob measures the state of each photon that he receives by randomly picking either basis. Over the classical channel, Alice and Bob check that Bob has received a photon for every photon that Alice has sent and then Alice and Bob tell each other the bases that they used for encoding and decoding (measuring) each bit. When the choice of bases agrees, the bit value measured by Bob agrees with the bit value sent by Alice. In one example, this QKD application for symmetric key establishment may be adapted, based on quantum event detection and management techniques, to provide failure monitoring and recovery for monitoring for a failure of the QKD application and initiating a recovery process when failure of the QKD application is detected. In the absence of any particular protocol for quantum system error handling (which might otherwise put additional constraints on the application of such techniques for supporting security for and recovery of the QKD application for symmetric key establishment), security for and recovery of the QKD application for symmetric key establishment may be supported by using timers at the source end and the destination end of the quantum channel. For example, Alice starts a timer when she sends her sequence of photons to Bob through the quantum channel and Bob starts a timer after receiving a photon from Alice through the quantum channel and, in response to either of the two timers expiring, the owner of the timer that expires (i.e., Alice or Bob) will notify an agent configured to initiate a disaster recovery process (e.g., SDN controller 130, either directly or indirectly via master vQMEC node 121-0). For example, the agent configured to initiate the disaster recovery process may perform monitoring for such notifications (e.g., the agent may keep a counter and take action, such as initiating a disaster recovery process, upon crossing a specified predefined security threshold or QoS value) and may take appropriate action based on various events or conditions (e.g., initiating a disaster recovery process, such as initiating a process for providing additional resources to support the quantum channel and associated quantum communications). It will be appreciated that such techniques may support protection of the QKD application for symmetric key establishment from various events which may compromise security (e.g., photon tampering, photon delay, photon loss, or any other anomalies, degradations, failures, or other conditions related to the quantum channel). It will be appreciated that various aspects of providing event detection and management for quantum communications may be applied in various other ways for supporting event detection and management for various aspects of quantum communications (e.g., various aspects of the quantum channel such as degradation and failure of the quantum channel, various aspects of quantum information transfers via quantum channels such as corruption or loss of qubits, various other types of quantum applications such as quantum teleportation applications and quantum de-coherence applications, and so forth).

It will be appreciated that various aspects of the foregoing example may be further understood when the example is considered in additional detail within the specific context of the communication system 100 of FIG. 1. In this example, a sending vQMEC node (e.g., one of the vQMEC nodes 121, which also may correspond to Alice in the example above) starts sending a sequence of photons to a remote vQMEC node (e.g., one of the vQMEC nodes 121, which also may correspond to Bob in the example above) via a quantum channel 120. The sending vQMEC node 121 starts a timer when it begins sending the sequence of photons (e.g., upon sending the first photon) and the remote vQMEC node 121 starts a time when it begins receiving the sequence of photons (e.g., upon receiving the first photon). As soon as either of the timers expires, the vQMEC node 121 that detects the expired timer will send a notification indicative of the expiration of the timer. The notification is intended for delivery to the SDN controller 130 and may be routed to the SDN controller 130 in various ways (e.g., directly such as where the detecting vQMEC node 121 is the master vQMEC node 121-0 or a master vQMEC node is not employed, indirectly via the master vQMEC node 121-0, and so forth). The SDN controller 130 may keep a counter for controlling initiation of a disaster recovery process based on detection of an event associated with the QKD application for symmetric key establishment between the two vQMEC nodes 121. The SDN controller 130 may initiate a disaster recovery process upon detecting a predefined threshold or QoS value. The initiation of the disaster recovery process may include initiating deployment of additional resources which may support the vQMEC nodes 121 for which the event associated with the QKD application was detected (e.g., notifying a VM deployment controller to initiate on-demand VM deployment for either or both of the vQMEC nodes 121 for which the event associated with the QKD application was detected). It will be appreciated that, since the vQMEC nodes 121 may be operating within network slices 111, this may be considered to be per-slice VM deployment. The deployment of additional resources, such as deployment of VMs by a VM deployment controller (or VM orchestrator) may be performed based on SDN (e.g., using SDN instructions which may be provided to the vQMEC nodes 121 for which the event associated with the QKD application was detected over various communication channels, such as via fiber optics, quantum satellite, and so forth). The SDN controller 130 also may be configured to support monitoring for the quantum communication after initiation of the disaster recovery process (e.g., based on reporting by either or both of the vQMEC nodes 121 for which the event associated with the QKD application was detected, based on reporting by the master vQMEC node 121-0 on behalf of either or both of the vQMEC nodes 121 for which the event associated with the QKD application was detected, and so forth) such that the SDN controller 130 may initiate any other actions which may be required (e.g., deployment of additional resources if the original deployment of additional resources was insufficient, termination of the additional resources after the detected event has been handled, and so forth). The SDN controller 130 also may create rules (e.g., predictive policy rules or other suitable types of rules) which are used by the vQMEC nodes 121 for event detection and reporting for quantum communications and may provide the rules to the vQMEC nodes 121 for use in performing event detection and reporting for quantum communications. The SDN controller 130 may create the rules which are used by the vQMEC nodes 121 for event detection and reporting for quantum communications based on data analytics performed by the SDN controller 130 using various types of data reported by vQMEC nodes 121. It will be appreciated that various functions discussed above within the context of the examples for supporting the QKD application for symmetric key establishment may be applied for providing event detection and management for various other aspects of quantum communications (e.g., various aspects of the quantum channel such as degradation and failure of the quantum channel, various aspects of quantum information transfers via quantum channels such as corruption or loss of qubits, various other types of quantum applications such as quantum teleportation applications and quantum de-coherence applications, and so forth).

It will be appreciated that the communication system 100 is configured to support various event detection and management capabilities within the context of a quantum 5G network using a MEC environment based on SDN-supported 5G RAN network slicing. It will be appreciated that the communication system 100 may be configured to support a method of security disaster recovery for virtual quantum MEC located in edge networks by leveraging SDN-supported network RAN slicing in order to maintain sustainable edge-to-edge secure intelligence in a Mobility RAN, such as 5G cloud RAN (CRAN). It will be appreciated that network RAN slicing may be leveraged to enable each 5G network slice 111 to have its own vQMEC node 121 in the edge cloud 101 and associated QN 122 in the core cloud 102, and to enable such elements to cooperate with each other and with SDN controller 130 to support a method of security disaster recovery for virtual quantum MEC located in edge networks. It will be appreciated that the communication system 100 may be configured to support interconnection of various quantum enabled elements (e.g., vQMEC nodes 121, QNs 122, QSDN nodes 139, and so forth) for various purposes, such as for load balancing purposes, monitoring purposes, performance and security monitoring purposes, disaster recovery purposes, and so forth.

It will be appreciated that the communication system 100 has been simplified and, therefore, that the communication system 100 may be implemented in a different form than that which is illustrated in FIG. 1. For example, the communication system 100 may be expanded by including additional communication devices, networks, resources, resource management functions, management systems, and so forth, without altering the scope of the present disclosure. For example, the communication system 100 may be altered to omit various elements, substitute elements for other elements that perform the same or similar functions, combine elements that are illustrated as separate elements, and/or implement elements as functions that are spread across several devices that operate collectively as the respective elements, without altering the scope of the present disclosure. It will be appreciated that the communication system 100 may be modified in various other ways while still supporting asset location tracking in an open space environment. Therefore, these and various other modifications are all contemplated within the scope of the present disclosure.

Figure 2:
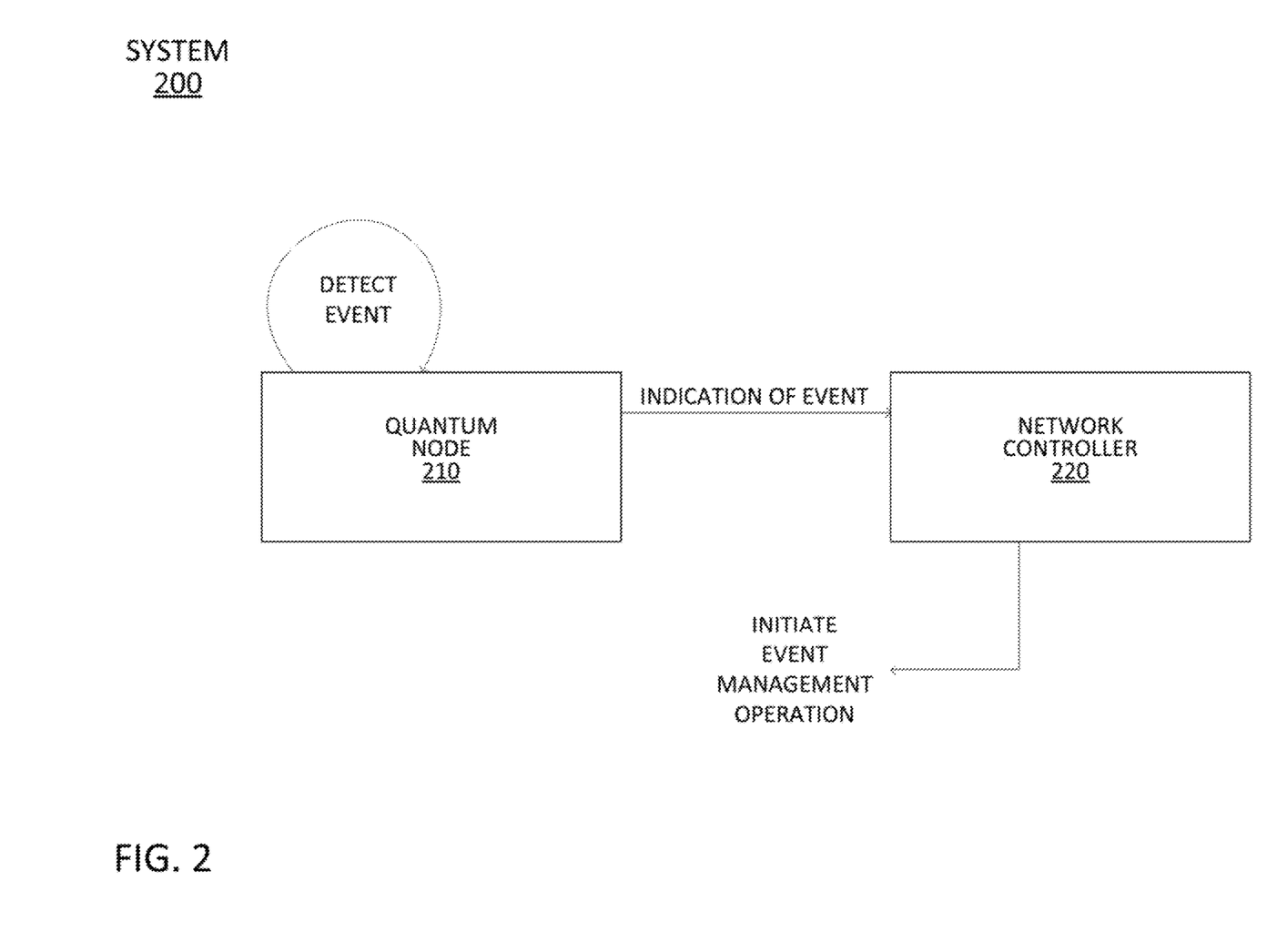
FIG. 2 illustrates an example system for providing event detection and management for quantum communications in a communication network.
Figure 3:
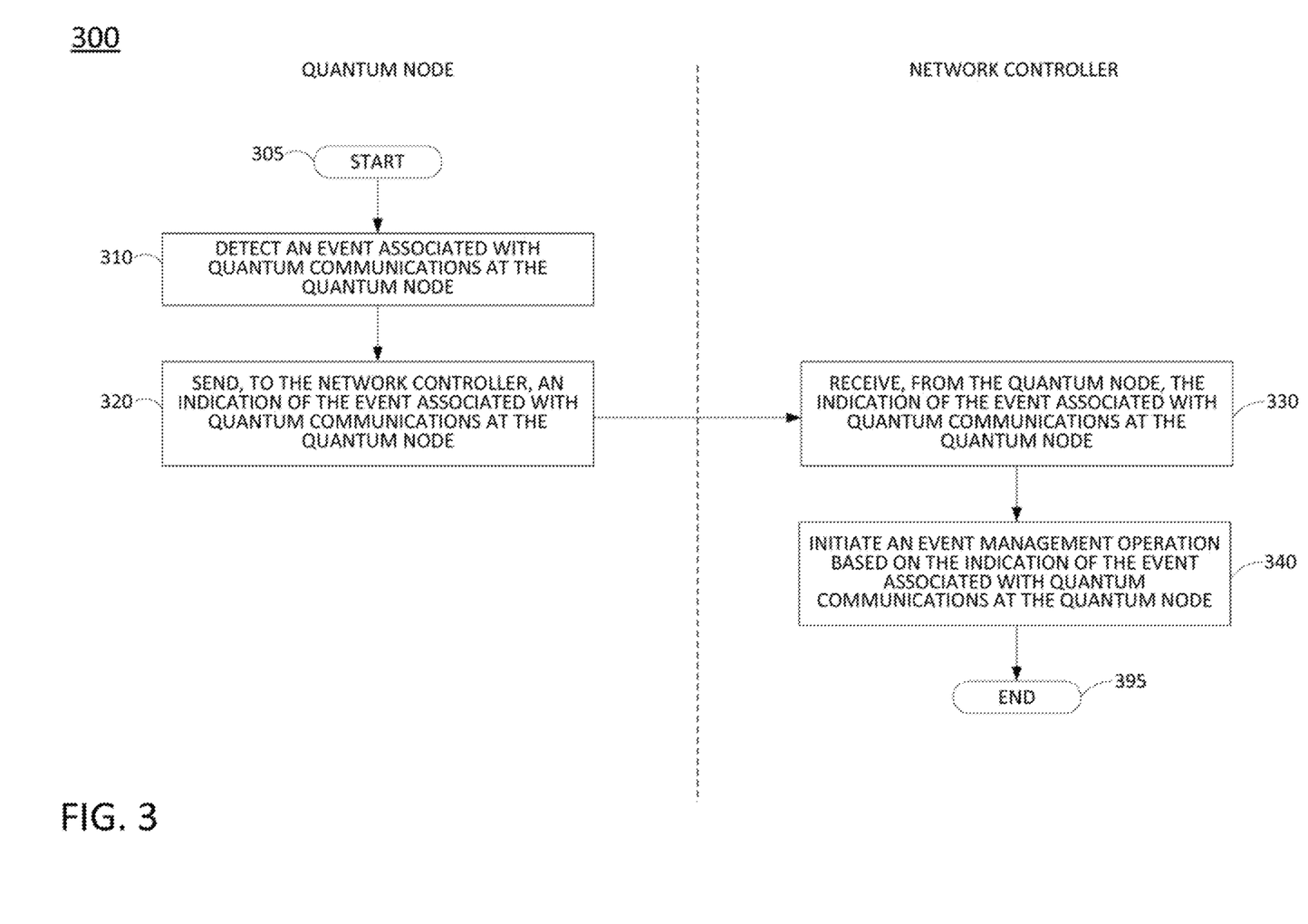
FIG. 3 illustrates a flowchart of an example method for providing event detection and management for quantum communications in a communication network.
Figure 4:
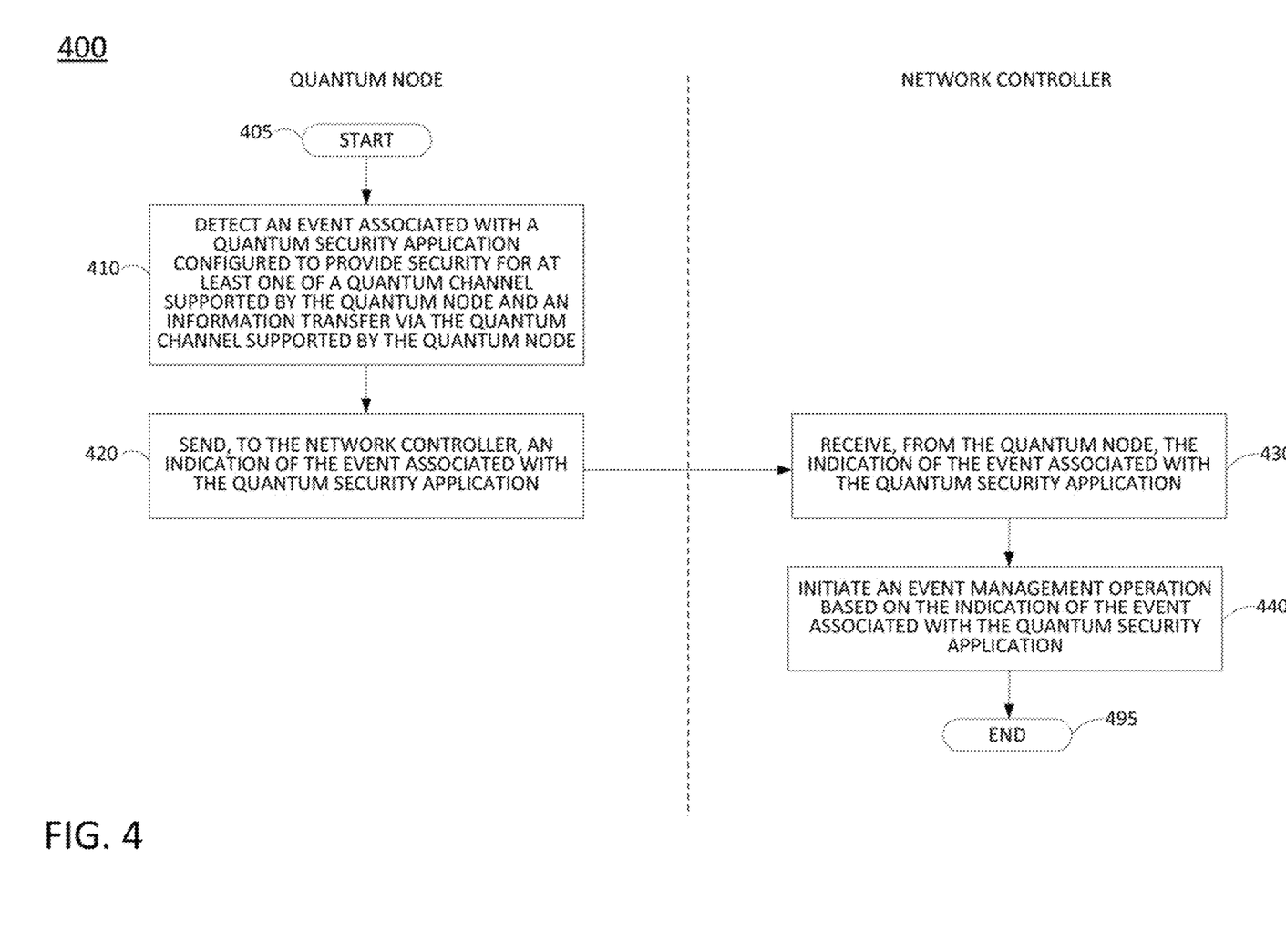
FIG. 4 illustrates a flowchart of an example method for providing event detection and management for quantum communications in a communication network.

It is noted that various features discussed in conjunction with FIG. 1 may be further understood from the example system of FIG. 2 and the example methods of FIG. 3 and FIG. 4.

FIG. 2 illustrates an example system for providing event detection and management for quantum communications in a communication network.

The system 200 of FIG. 2 represents a more generalized version of portions of the communication system 100 of FIG. 1, for illustrating that various aspects of event detection and management presented herein within the context of the communication system 100 of FIG. 1 (i.e., a specific communication system) may be provided within various other communication systems utilizing quantum communications. More specifically, while primarily presented herein with respect to providing event detection and management for quantum communications in a particular type of communication network (namely, a 5G cellular network) based on a particular communication network architecture (namely, based on use of MEC, network slicing based on virtualization, and network control that is based on SDN), various examples presented herein may be used for providing event detection and management for quantum communications in various other types of communication networks, in communication networks based on various other communication network architectures, and so forth.

The system 200 of FIG. 2 includes a quantum node (QN) 210 and a network controller (NC) 220. It will be appreciated that, where the system 200 of FIG. 2 is used to represent the commination system 100 of FIG. 1, the QN 210 may correspond to one of the quantum enabled nodes of FIG. 1 (e.g., a vQMEC node 121, a QN 122, and the like) and the NC 220 may correspond to the SDN controller 130 of FIG. 1.

The QN 210 may be configured to support event detection and management for quantum communications in a communication network. The QN 210 may be configured to support quantum communications. The QN 210 may be configured to support a quantum channel that is configured to support transfer of information (e.g., quantum information, classical information, and so forth). The QN 210 may be configured to support transfer of information (e.g., quantum information, classical information, and the like) via the quantum channel. The QN 210 may be configured to support use of various quantum applications configured to support various aspects of the quantum channel, information transfers via the quantum channel, and so forth. The QN 210 may be configured to detect an event and send an indication of the event for delivery to the NC 220. The event may be an event associated with the QN 210. The event may be an event associated with quantum communications by the QN 210 (which also may be referred to as an event associated with support of quantum communications by the QN 210 since, as indicated herein, the QN 210 may support various different aspects of quantum communications). The event may be an event associated with the quantum channel (e.g., degradation of the quantum channel, loss of the quantum channel, and the like), an event associated with transfer of information via the quantum channel (e.g., corruption of qubits, loss of qubits, and the like), an event associated with a quantum application (e.g., a quantum application supporting the quantum channel, a quantum application supporting information transfers via the quantum channel, and the like), and so forth. The event may be based on an expiration of a timer of the QN 210 (e.g., a timer related to detection of a photon condition on the quantum channel (e.g., where the photon condition is sending of an initial photon via the quantum channel or receipt of an initial photon via the quantum channel)). The QN 210 may be configured to detect the event by monitoring for the event. The QN 210 may be configured to detect the event based on a set of rules received from the NC 220 (e.g., by using the set of rules to monitor for the event). The QN 210 may be configured to receive a message associated with an event management operation initiated by the NC 220 based on the event (e.g., an instruction for reconfiguration of the QN 210, an instruction for allocation of additional resources of the QN 210 to the quantum channel, and the like). The QN 210 may be configured to support various other functions for supporting event detection and management for various aspects of quantum communications in a communication network.

The NC 220 may be configured to support event detection and management for quantum communications in a communication network. The NC 220 may be configured to receive, from QN 210, the indication of the event and initiate, based on the indication of the event, an event management operation. The event may be an event associated with the QN 210. The event may be an event associated with quantum communications by the QN 210 (which also may be referred to as an event associated with support of quantum communications by the QN 210 since, as indicated herein, the QN 210 may support various different aspects of quantum communications). The event may be an event associated with the quantum channel (e.g., degradation of the quantum channel, loss of the quantum channel, and the like), an event associated with transfer of information via the quantum channel (e.g., corruption of qubits, loss of qubits, and the like), an event associated with a quantum application (e.g., a quantum application supporting the quantum channel, a quantum application supporting information transfers via the quantum channel, and the like), and so forth. The event may be based on an expiration of a timer of the QN 210 (e.g., a timer related to detection of a photon condition on the quantum channel (e.g., where the photon condition is sending of an initial photon via the quantum channel or receipt of an initial photon via the quantum channel)). The event management operation initiated by the NC 220 may be initiated to the QN 210 (e.g., an instruction for reconfiguration of the QN 210, an instruction for allocation of additional resources of the QN 210 to the quantum channel, and the like). The event management operation initiated by the NC 220 may be initiated to one or more elements configured to interact with the QN 210 to support event management based on an event associated with the quantum communication of the quantum channel supported by the QN 210 (e.g., a network management system, a network provisioning system, a resource management system, a network orchestrator, and the like). The NC 220 may be configured to support various other functions for supporting event detection and management for various aspects of quantum communications in a communication network.

It will be appreciated that although primarily presented with respect to direct interaction between the QN 210 and the NC 220 for supporting event detection and management, various aspects of event detection and management may be provided using indirect interaction between the QN 210 and the NC 220 (e.g., via one or more intermediate elements which may be used for various purposes such as load balancing, reliability, and so forth).

It will be appreciated that various functions described herein within the context of FIG. 1 also may be provided within the context of FIG. 2 and, similarly, that various functions described herein within the context of FIG. 2 also may be provided within the context of FIG. 1 or various other contexts within which event detection and management for quantum communications in a communication network may be provided.

FIG. 3 illustrates a flowchart of an example method for providing event detection and management for quantum communications in a communication network. As illustrated in FIG. 3, a portion of the steps of method 300 are performed by a quantum node (e.g., by a processing system of the quantum node) and a portion of the steps of method 300 are performed by a network controller (e.g., by a processing system of the network controller). In one example, the method 300 is performed by components of the system 100 of FIG. 1 (e.g., a vQMEC node 121 or QN 122 operating as the quantum node and the SDN controller 130 operating as the network controller) or components of the system 200 of FIG. 2 (e.g., the QN 210 operating as the quantum node and the NC 220 operating as the network controller). In one example, various steps, functions, or operations of method 300 may be performed by one or more computing systems similar to computing system 500 as described in connection with FIG. 5 below. For instance, the computing system 500 may represent any one or more components of the system 100 of FIG. 1 or any one or more components of the system 200 of FIG. 2 that is/are configured to perform steps, functions, and/or operations of the method 300. Similarly, in one example, steps, functions, and/or operations of method 300 may be performed by a processing system including one or more computing devices collectively configured to perform various steps, functions, and/or operations of the method 300. For instance, multiple instances of the computing system 500 may collectively function as a processing system.

As illustrated in FIG. 3, the method 300 begins in step 305 and proceeds to step 310. At step 310, the processing system of the quantum node may detect an event associated with quantum communications at the quantum node. At step 320, the processing system of the quantum node may send, toward the network controller, an indication of the event associated with quantum communications at the quantum node. At step 330, the processing system of the network controller may receive, from the quantum node, the indication of the event associated with quantum communications at the quantum node. At step 340, the processing system of the network controller may initiate an event management operation based on the indication of the event associated with quantum communications at the quantum node. Following step 340, the method 300 proceeds to step 395 where the method 300 ends.

It will be appreciated that the method 300 may be expanded to include additional steps, or may be modified to replace steps with different steps, to combine steps, to omit steps, to perform steps in a different order, and so forth. It will be appreciated that these and other modifications are all contemplated within the scope of the present disclosure.

It will be appreciated, although not expressly specified above, one or more steps of the method 300 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Thus, the use of the term "optional step" is intended to reflect different variations of a particular illustrative example and is not intended to indicate that steps not labelled as optional steps to be deemed to be essential steps. Furthermore, operations, steps, or blocks of the above described method(s) can be combined, separated, and/or performed in a different order from that described above, without departing from the examples of the present disclosure.

FIG. 4 illustrates a flowchart of an example method for providing event detection and management for quantum communications in a communication network. As illustrated in FIG. 4, a portion of the steps of method 400 are performed by a quantum node (e.g., by a processing system of the quantum node) and a portion of the steps of method 400 are performed by a network controller (e.g., by a processing system of the network controller). In one example, the method 400 is performed by components of the system 100 of FIG. 1 (e.g., a vQMEC node 121 or QN 122 operating as the quantum node and the SDN controller 130 operating as the network controller) or components of the system 200 of FIG. 2 (e.g., the QN 210 operating as the quantum node and the NC 220 operating as the network controller). In one example, the steps, functions, or operations of method 400 may be performed by a computing system 500 as described in connection with FIG. 5 below. For instance, the computing system 500 may represent any one or more components of the system 100 of FIG. 1 or any one or more components of the system 200 of FIG. 2 that is/are configured to perform the steps, functions, and/or operations of the method 400. Similarly, in one example, the steps, functions, and/or operations of method 400 may be performed by a processing system including one or more computing devices collectively configured to perform various steps, functions, and/or operations of the method 400. For instance, multiple instances of the computing system 500 may collectively function as a processing system.

As illustrated in FIG. 4, the method 400 begins in step 405 and proceeds to step 410.

At step 410, the processing system of the quantum node may detect an event associated with a quantum security application configured to provide security for at least one of a quantum channel supported by the quantum node and an information transfer via the quantum channel supported by the quantum node. At step 420, the processing system of the quantum node may send, toward the network controller, an indication of the event associated with the quantum security application. In one example, the indication of the event associated with the quantum security application is sent toward a master quantum node configured to provide the indication of the event associated with the quantum security application to the network controller. In one example, the indication of the event associated with the quantum security application is sent toward the network controller. In one example, the quantum security application comprises a quantum key distribution application or a quantum teleportation application. In one example, detecting the event associated with the quantum security application includes starting, by the processing system of the quantum node, a timer in response to detection of a photon condition on the quantum channel, wherein the photon condition includes a sending of an initial photon via the quantum channel or a receiving of an initial photon via the quantum channel and detecting, by the processing system of the processing node based on a determination that the timer has expired, the event associated with the quantum security application. In one example, the processing system of the quantum node may receive a message associated with an event management operation initiated by the network controller based on the indication of the event associated with the quantum security application. In one example, the processing system of the quantum node may detect a second event associated with the quantum node and send, for delivery to the network controller, an indication of the second event associated with the quantum node. In one example, the second event associated with the quantum node includes at least one of an event associated with the quantum channel, an event associated with the information transfer via the quantum channel, and an event associated with a quantum application configured to support quantum communications at the quantum node.

At step 430, the processing system of the network controller may receive, from the quantum node, the indication of the event associated with quantum security application. At step 440, the processing system of the network controller may initiate an event management operation based on the indication of the event associated with the quantum security application. In one example, the indication of the event associated with the quantum security application is received from the quantum node. In one example, the indication of the event associated with the quantum security application is received from a master quantum node with which the quantum node is associated. In one example, the event associated with the quantum security application is based on an expiration of a timer of the quantum node. In one example, the event management operation for the quantum security application includes providing an additional resource for the quantum node. In one example, the processing system of the network controller may receive a second event associated with the quantum node and initiate, based on the second event associated with the quantum node, a second event management operation for the quantum node. In one example, the second event associated with the quantum node includes at least one of an event associated with the quantum channel, an event associated with the information transfer via the quantum channel, and an event associated with a quantum application configured to support quantum communications at the quantum node.

Following step 440, the method 400 proceeds to step 495 where the method 400 ends.

It will be appreciated that the method 400 may be provided within various contexts. In one example, the quantum node is associated with a network slice of a communication network. In one example, the network controller is based on software defined networking. In one example, the quantum node is associated with an edge cloud configured to support edge computing. In one example, the network controller is associated with a core cloud associated with an edge cloud.

It will be appreciated that the method 400 may be expanded to include additional steps, or may be modified to replace steps with different steps, to combine steps, to omit steps, to perform steps in a different order, and so forth. It will be appreciated that these and other modifications are all contemplated within the scope of the present disclosure.

It will be appreciated, although not expressly specified above, one or more steps of the method 400 may include storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 4 that recite a determining operation or involve a decision do not necessarily require that both branches of the determining operation be practiced. In other words, one of the branches of the determining operation can be deemed as an optional step. Thus, the use of the term "optional step" is intended to reflect different variations of a particular illustrative example and is not intended to indicate that steps not labelled as optional steps to be deemed to be essential steps. Furthermore, operations, steps, or blocks of the above described method(s) can be combined, separated, and/or performed in a different order from that described above, without departing from the examples of the present disclosure.

It will be appreciated that various examples of the present disclosure for providing event detection and management for quantum communications in a communication network may provide various advantages or potential advantages. For example, various examples of the present disclosure for providing event detection and management for quantum communications in a communication network may provide improved quantum capacity and security in various types of communication networks (e.g., wireless networks, optical networks, hybrid fiber coax networks, and so forth). For example, various examples of the present disclosure for providing event detection and management for quantum communications in a communication network may reduce or eliminate the risk of hacking. For example, various examples of the present disclosure for providing event detection and management for quantum communications in a communication network may provide improved quality-of-service (QoS) on demand. For example, various examples of the present disclosure for providing event detection and management for quantum communications in a communication network may provide enhanced reliability. For example, various examples of the present disclosure for providing event detection and management for quantum communications in a communication network may provide unique disaster recovery techniques and capabilities for quantum networking. For example, various examples of the present disclosure for providing event detection and management for quantum communications in a communication network may provide various providers (e.g., network providers, service providers, and so forth) with market differentiation, new opportunities, new revenue streams, and so forth. It will be appreciated that various examples of the present disclosure for providing event detection and management for quantum communications in a communication network may provide various other advantages or potential advantages.

It will be appreciated that, as used herein, the terms "configure" and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures, and the like, which may cause a processing system executing computer-readable instructions, code, and/or programs to function differently depending upon the values of the variables or other data structures that are provided. As referred to herein, a "processing system" may include a computing device including one or more processors or cores or multiple computing devices collectively configured to perform various steps, functions, and/or operations as discussed herein.

Figure 5:
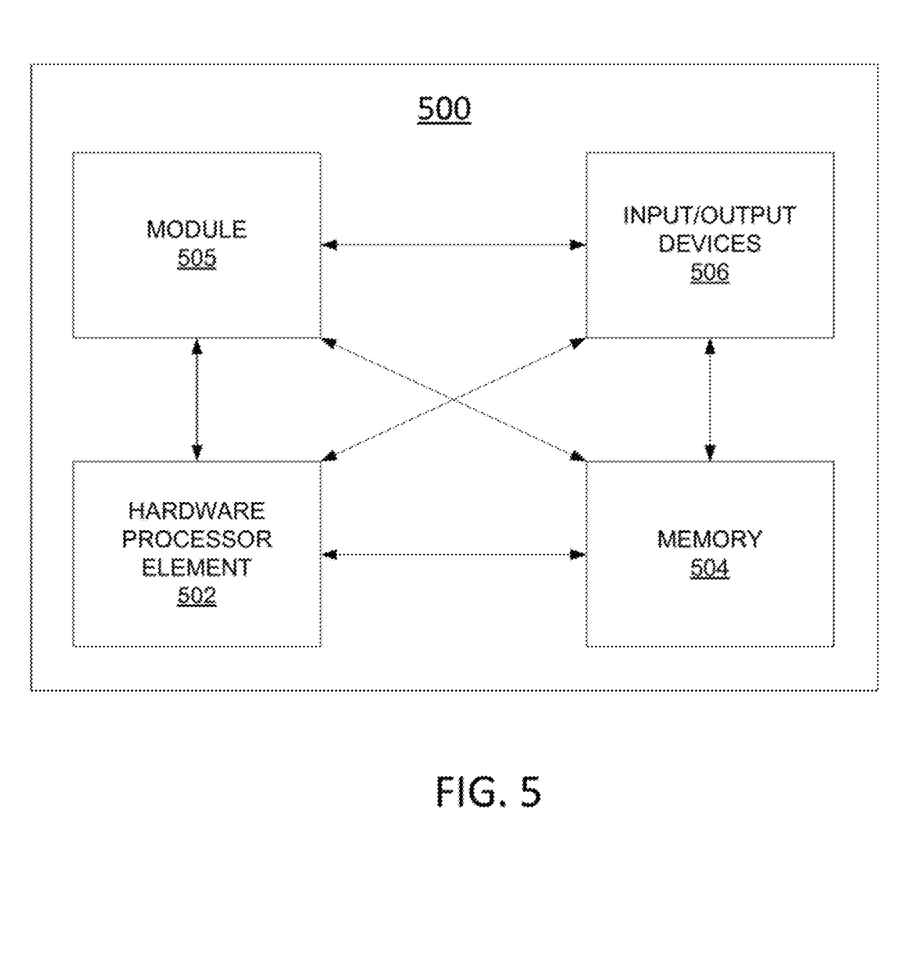
FIG. 5 illustrates a high level block diagram of a computing system specifically programmed to perform various steps, functions, blocks, and/or operations described herein.

FIG. 5 depicts a high-level block diagram of a computing system 500 (e.g., a computing device or processing system) specifically programmed to perform the functions described herein. For example, any one or more components or devices illustrated in FIG. 1 or FIG. 2, or described in connection with the method 300 of FIG. 3 or the method 400 of FIG. 4, may be implemented as the computing system 500. As depicted in FIG. 5, the computing system 500 comprises a hardware processor element 502 (e.g., comprising one or more hardware processors, which may include one or more microprocessor(s), one or more central processing units (CPUs), and the like, where the hardware processor element 502 may also represent one example of a "processing system" as referred to herein), a memory 504 (e.g., random access memory (RAM), read only memory (ROM), a disk drive, an optical drive, a magnetic drive, a Universal Serial Bus (USB) drive, and the like), a module 505 for providing event detection and management for quantum communications in a communication network, and various input/output devices 506 (e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It will be appreciated that, although one hardware processor element 502 is shown, the computing system 500 may employ a plurality of hardware processor elements. Furthermore, although one computing device is shown in FIG. 5, if the methods as discussed above are implemented in a distributed or parallel manner for a particular illustrative example, e.g., the steps of the above methods or the entire methods are implemented across multiple or parallel computing devices, then the computing system 500 of FIG. 5 may represent each of those multiple or parallel computing devices. Furthermore, one or more hardware processor elements 502 can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 502 can also be configured or programmed to cause other devices to perform one or more operations as discussed above. In other words, the hardware processor element 502 may serve the function of a central controller directing other devices to perform the one or more operations as discussed above.

It will be appreciated that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 505 for providing event detection and management for quantum communications in a communication network (e.g., a software program comprising computer-executable instructions) can be loaded into memory 504 and executed by hardware processor element 502 to implement the steps, functions or operations as discussed above in connection with the example method 300 of FIG. 3 or the example method 400 of FIG. 4. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The hardware processor element 502 executing the computer-readable instructions relating to the above described method(s) can be perceived as a programmed processor or a specialized processor. As such, the module 505 for providing event detection and management for quantum communications in a communication network (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various embodiments have been described above, it should be understood that they have been presented by way of example and not limitation. Thus, the breadth and scope of a preferred embodiment should not be limited by any of the above-described example embodiments, but should be defined in accordance with the following claims and their equivalents.

What is claimed is:

1. A method comprising:
   detecting, by a processing system of a quantum node in a communication network, an event associated with a quantum security application configured to provide security for at least one of: a quantum channel supported by the quantum node or an information transfer via the quantum channel supported by the quantum node, wherein the quantum security application comprises a quantum teleportation application;
   sending, by the processing system for delivery to a network controller of the communication network, an indication of the event associated with the quantum security application; and
   receiving, by the processing system, a message associated with an event management operation initiated by the network controller based on the indication of the event associated with the quantum security application, wherein the event management operation comprises instantiating one or more virtual machines.

2. The method of claim 1, wherein the indication of the event associated with the quantum security application is sent toward a master quantum node configured to provide the indication of the event associated with the quantum security application to the network controller.

3. The method of claim 1, wherein the indication of the event associated with the quantum security application is sent toward the network controller.

4. The method of claim 1, further comprising:
   detecting, by the processing system, a second event associated with the quantum node; and
   sending, by the processing system for delivery to the network controller, an indication of the second event associated with the quantum node.

5. The method of claim 4, wherein the second event associated with the quantum node includes at least one of: an event associated with the quantum channel, an event associated with the information transfer via the quantum channel, or an event associated with a quantum application configured to support quantum communications at the quantum node.

6. The method of claim 1, wherein the quantum node is associated with a network slice of a communication network, wherein the network controller is based on software defined networking.

7. The method of claim 1, wherein the quantum node is associated with an edge cloud configured to support edge computing, wherein the network controller is associated with a core cloud associated with the edge cloud.

8. An apparatus comprising:
   a processing system including at least one processor; and
   a non-transitory computer-readable medium storing instructions which, when executed by the processing system when deployed in a communication network, cause the processing system to perform operations of a quantum node, the operations comprising:

detecting, by the quantum node, an event associated with a quantum security application configured to provide security for at least one of: a quantum channel supported by the quantum node or an information transfer via the quantum channel supported by the quantum node, wherein the quantum security application comprises a quantum teleportation application;

sending, by the quantum node for delivery to a network controller of the communication network, an indication of the event associated with the quantum security application; and     receiving, by the quantum node, a message associated with an event management operation initiated by the network controller based on the indication of the event associated with the quantum security application, wherein the event management operation comprises instantiating one or more virtual machines.

9. The apparatus of claim 8, wherein the indication of the event associated with the quantum security application is sent toward a master quantum node configured to provide the indication of the event associated with the quantum security application to the network controller.

10. The apparatus of claim 8, wherein the indication of the event associated with the quantum security application is sent toward the network controller.

11. A method comprising:

receiving, by a processing system of a network controller from a quantum node, an indication of an event associated with a quantum security application configured to provide security for at least one of: a quantum channel supported by the quantum node or an information transfer via the quantum channel supported by the quantum node, wherein the quantum security application comprises a quantum teleportation application;

initiating, by the processing system of the network controller based on the indication of the event associated with the quantum security application, an event management operation for the quantum security application; and     sending, by the processing system of the network controller, a message associated with the event management operation initiated by the network controller based on the indication of the event associated with the quantum security application, wherein the event management operation comprises instantiating one or more virtual machines.

12. The method of claim 11, wherein the indication of the event associated with the quantum security application is received from the quantum node.

13. The method of claim 11, wherein the indication of the event associated with the quantum security application is received from a master quantum node with which the quantum node is associated.

14. The method of claim 11, wherein the event management operation for the quantum security application includes providing an additional resource for the quantum node.

15. The method of claim 11, further comprising:

receiving, by the processing system, a second event associated with the quantum node; and     initiating, by the processing system based on the second event associated with the quantum node, a second event management operation for the quantum node.

16. The method of claim 15, wherein the second event associated with the quantum node includes at least one of: an event associated with the quantum channel, an event associated with the information transfer via the quantum channel, or an event associated with a quantum application configured to support quantum communications at the quantum node.

17. The method of claim 11, wherein the network controller is based on software defined networking, wherein the quantum node is associated with a network slice of a communication network.

18. The method of claim 11, wherein the network controller is associated with a core cloud, wherein the quantum node is associated with an edge cloud.

19. The apparatus of claim 8, the operations further comprising:

detecting a second event associated with the quantum node; and     sending, for delivery to the network controller, an indication of the second event associated with the quantum node.

20. The apparatus of claim 19, wherein the second event associated with the quantum node includes at least one of: an event associated with the quantum channel, an event associated with the information transfer via the quantum channel, or an event associated with a quantum application configured to support quantum communications at the quantum node.

\* \* \* \* \*